(12) United States Patent
Eronen et al.

(10) Patent No.: US 10,559,131 B2
(45) Date of Patent: Feb. 11, 2020

(54) MEDIATED REALITY

(71) Applicant: Nokia Technologies Oy, Espoo (FI)

(72) Inventors: Antti Eronen, Tampere (FI); Jussi Leppänen, Tampere (FI); Juha Arrasvuori, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 46 days.

(21) Appl. No.: 15/627,679

(22) Filed: Jun. 20, 2017

(65) Prior Publication Data

US 2017/0372522 A1 Dec. 28, 2017

(30) Foreign Application Priority Data

Jun. 28, 2016 (EP) .................................. 16176611

(51) Int. Cl.
| | | |
|---|---|---|
| *G06T 19/00* | (2011.01) | |
| *G06F 3/01* | (2006.01) | |
| *G06F 3/0481* | (2013.01) | |
| *G06F 3/0484* | (2013.01) | |
| *G06T 19/20* | (2011.01) | |

(52) U.S. Cl.
CPC ............ *G06T 19/006* (2013.01); *G06F 3/017* (2013.01); *G06F 3/04815* (2013.01); *G06F 3/04845* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 5,963,215 A | 10/1999 | Rosenzweig | |
| 2012/0182293 A1 | 7/2012 | Nolze | |
| 2015/0325040 A1* | 11/2015 | Stirbu | G06T 19/006 345/421 |
| 2016/0162244 A1* | 6/2016 | Christmas | G06T 15/00 345/1.3 |
| 2018/0359487 A1* | 12/2018 | Bang | H04N 19/50 |

FOREIGN PATENT DOCUMENTS

EP 1288618 3/2003

OTHER PUBLICATIONS

Pujol et al., "3D Visualization of Dicom Images for Radiological Applications", Surgical Planning Laboratory, Sep. 2014, 124 pages.
(Continued)

*Primary Examiner* — Yi Wang
(74) *Attorney, Agent, or Firm* — Harrington & Smith

(57) ABSTRACT

A method comprising:
  causing display of a polyhedral virtual object, having a first number (M) of faces, in a virtual visual space, wherein each of at least a second number (N) of the M faces, displays content captured from an associated one of N different camera perspectives;
  causing rotation of the polyhedral virtual object in the virtual visual space to select a first face of the at least M faces of the polyhedral virtual object by orienting the first face in a predetermined direction within the virtual visual space; and
  causing display of the content captured from the camera perspective associated with the selected first face of the polyhedral virtual object.

18 Claims, 15 Drawing Sheets

(56) References Cited

OTHER PUBLICATIONS

"Using ParaView to Visualize Scientific Data (online tutorial)", Boston University (BU) TechWeb, Retrieved on Oct. 11, 2017, Webpage available at : http://www.bu.edu/tech/support/research/training-consulting/online-tutorials/paraview/.

Smith., "Idea-Generation Techniques: A Formulary of Active Ingredients", Journal of creative behavior, vol. 32, No. 2, Jun. 1998, pp. 107-133.

Shah et al., "Metrics for Measuring Ideation Effectiveness", Design Studies, vol. 24, No. 2, Mar. 2003, pp. 111-134.

Smith, "Towards a logic of innovation", The International Handbook on Innovation, Dec. 2005. p. 347-365.

Extended European Search Report received for corresponding European Patent Application No. 16176611.8, dated Dec. 8, 2016, 6 pages.

* cited by examiner

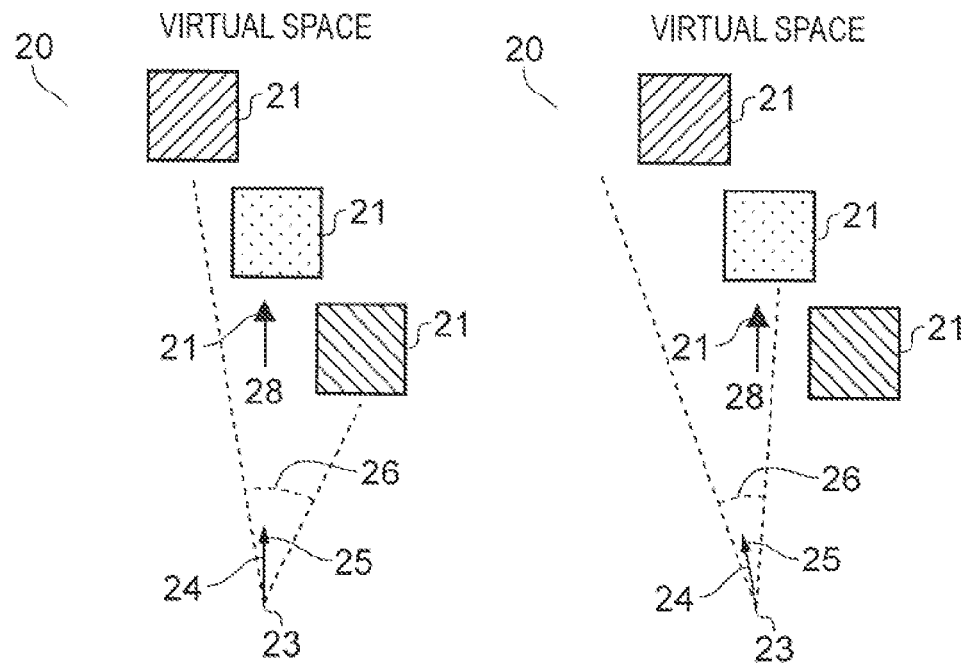
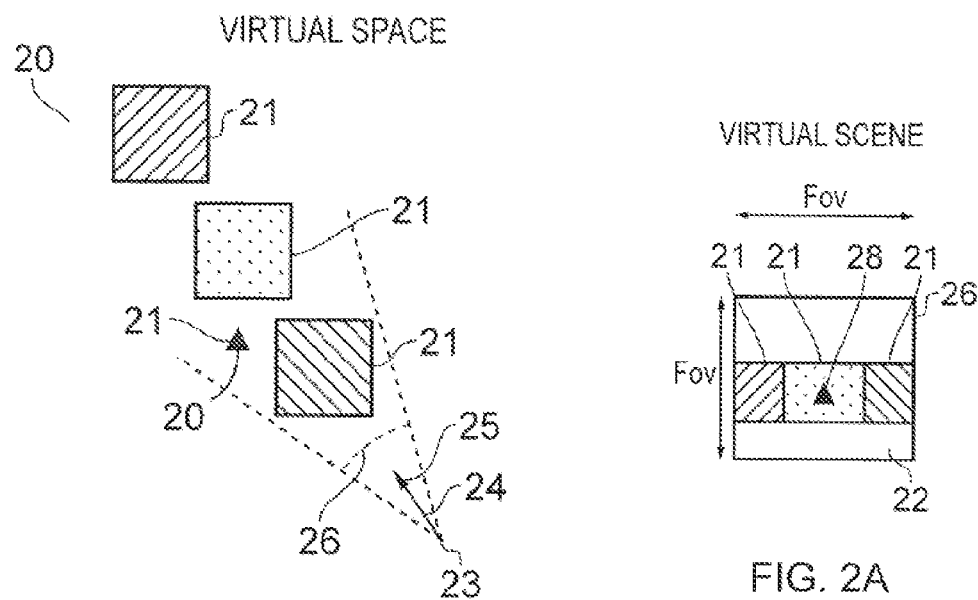

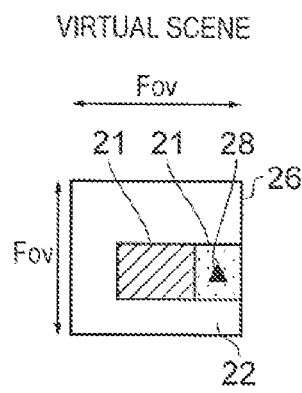
FIG. 2B
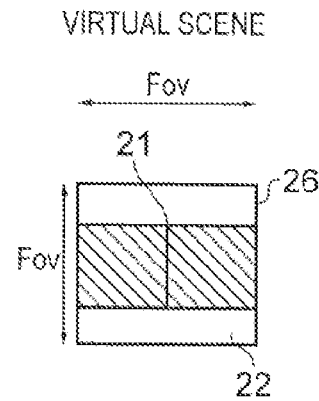
FIG. 2C
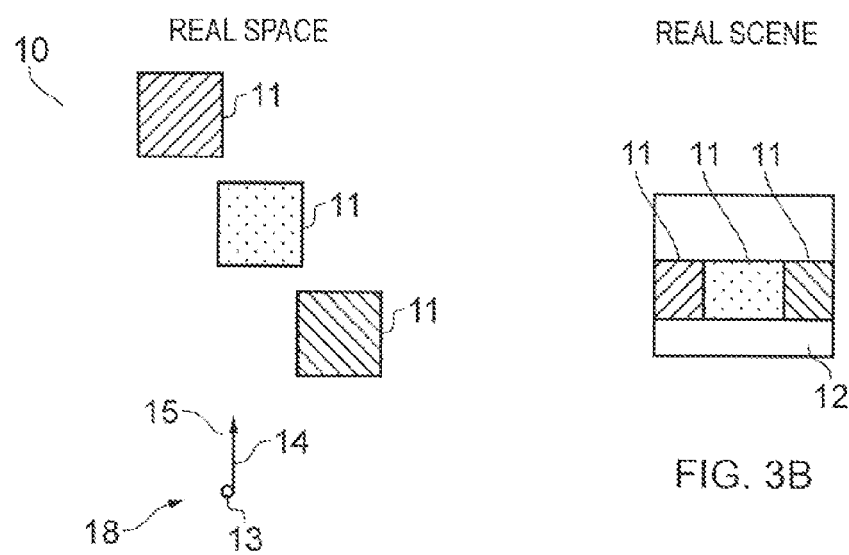
FIG. 3B
FIG. 3A

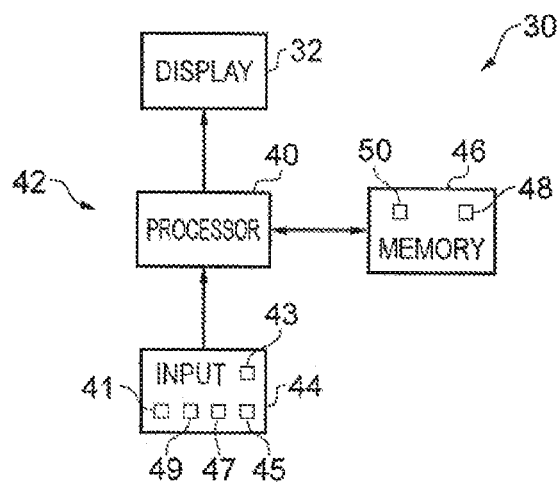
FIG. 4
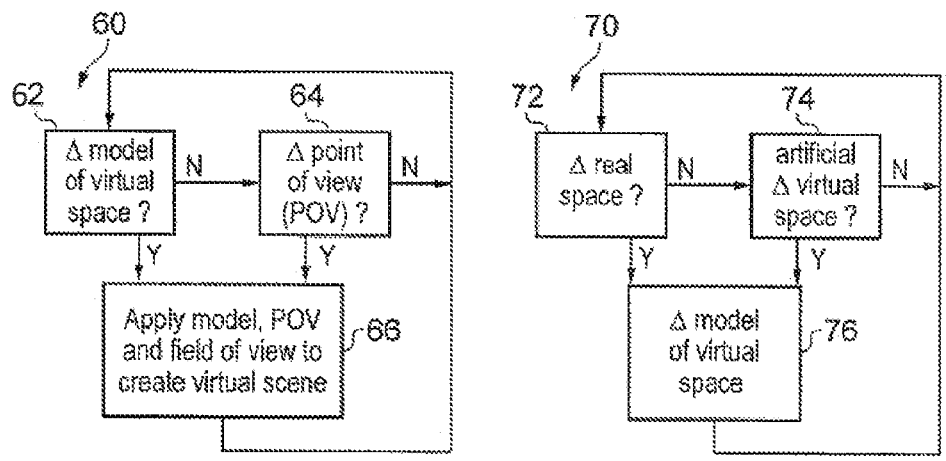
FIG. 5A
FIG. 5B

MEDIATED REALITY

TECHNOLOGICAL FIELD

Embodiments of the present invention relate to mediated reality for example augmented reality or virtual reality.

BACKGROUND

Mediated reality in this document refers to a user experiencing or being capable of experiencing a fully or partially artificial environment.

Augmented reality is a form of mediated reality in which a user experiences a partially artificial, partially real environment. Virtual reality is a form of mediated reality in which a user experiences a fully artificial environment.

BRIEF SUMMARY

According to various, but not necessarily all, embodiments of the invention there is provided a method comprising:
  causing display of a polyhedral virtual object, having a first number (M) of faces, in a virtual visual space, wherein each of at least a second number (N) of the M faces, displays content captured from an associated one of N different camera perspectives;
  causing rotation of the polyhedral virtual object in the virtual visual space to select a first face of the at least M faces of the polyhedral virtual object by orienting the first face in a predetermined direction within the virtual visual space; and causing display of the content captured from the camera perspective associated with the selected first face of the polyhedral virtual object.

According to various, but not necessarily all, embodiments of the invention there are provided examples as claimed in the appended claims.

BRIEF DESCRIPTION

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene that partially corresponds with the virtual visual scene of FIG. 1B;

FIG. 4 illustrates an example of an apparatus that is operable to enable mediated reality and/or augmented reality and/or virtual reality;

FIG. 5A illustrates an example of a method for enabling mediated reality and/or augmented reality and/or virtual reality;

FIG. 5B illustrates an example of a method for updating a model of the virtual visual space for augmented reality;

DEFINITIONS

Figure 6A:
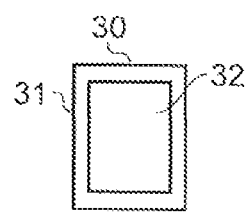
FIGS. 6A and 6B illustrate examples of apparatus that enable display of at least parts of the virtual visual scene to a user.

"artificial environment" is something that has been recorded or generated

"virtual visual space" refers to fully or partially artificial environment that may be viewed, which may be three dimensional.

"virtual visual scene" refers to a representation of the virtual visual space viewed from a particular point of view within the virtual visual space.

"real space" refers to a real environment, which may be three dimensional.

"real visual scene" refers to a representation of the real space viewed from a particular point of view within the real space.

"mediated reality" in this document refers to a user visually experiencing a fully or partially artificial environment (a virtual visual space) as a virtual visual scene at least partially displayed by an apparatus to a user. The virtual visual scene is determined by a point of view within the virtual visual space and a field of view. Displaying the virtual visual scene means providing it in a form that can be seen by the user.

"augmented reality" in this document refers to a form of mediated reality in which a user visually experiences a partially artificial environment (a virtual visual space) as a virtual visual scene comprising a real visual scene of a physical real world environment (real space) supplemented by one or more visual elements displayed by an apparatus to a user;

"virtual reality" in this document refers to a form of mediated reality in which a user visually experiences a fully artificial environment (a virtual visual space) as a virtual visual scene displayed by an apparatus to a user;

"perspective-mediated" as applied to mediated reality, augmented reality or virtual reality means that user actions determine the point of view within the virtual visual space, changing the virtual visual scene;

"first person perspective-mediated" as applied to mediated reality, augmented reality or virtual reality means perspective mediated with the additional constraint that the user's real point of view determines the point of view within the virtual visual space;

"third person perspective-mediated" as applied to mediated reality, augmented reality or virtual reality means perspective mediated with the additional constraint that the user's real point of view does not determine the point of view within the virtual visual space;

"user interactive-mediated" as applied to mediated reality, augmented reality or virtual reality means that user actions at least partially determine what happens within the virtual visual space;

"displaying" means providing in a form that is perceived visually (viewed) by the user.

DESCRIPTION

FIGS. 1A-1C and 2A-2C illustrate examples of mediated reality. The mediated reality may be augmented reality or virtual reality.

FIGS. 1A, 1B, 1C illustrate the same virtual visual space 20 comprising the same virtual objects 21, however, each FIG. illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

FIGS. 2A, 2B, 2C illustrate a virtual visual scene 22 from the perspective of the different points of view 24 of respective FIGS. 1A, 1B, 1C. The virtual visual scene 22 is determined by the point of view 24 within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20.

The mediated reality, augmented reality or virtual reality may be perspective-mediated. In this case, user actions determine the point of view 24 within the virtual visual space 20, changing the virtual visual scene 22. For example, as illustrated in FIGS. 1A, 1B, 1C a position 23 of the point of view 24 within the virtual visual space 20 may be changed and/or a direction or orientation 25 of the point of view 24 within the virtual visual space 20 may be changed. If the virtual visual space 20 is three-dimensional, the position 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates a real visual scene 12 that partially corresponds with the virtual visual scene 22 of FIG. 1B, it includes real objects 11 but not artificial virtual objects. The real visual scene is from a perspective corresponding to the point of view 24 in the virtual visual space 20 of FIG. 1A. The real visual scene 12 content is determined by that corresponding point of view 24 and the field of view 26.

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single point of view 24 or on multiple images from different points of view 24 at the same time, processed to generate an image from a single point of view 24.

FIG. 4 illustrates an example of an apparatus 30 that is operable to enable mediated reality and/or augmented reality and/or virtual reality.

The apparatus 30 comprises a display 32 for providing at least parts of the virtual visual scene 22 to a user in a form that is perceived visually by the user. The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods illustrated in FIGS. 5A & 5B. The processor 40 by reading the memory 46 is able to load and execute the computer program 48.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The apparatus 30 may enable mediated reality and/or augmented reality and/or virtual reality, for example using the method 60 illustrated in FIG. 5A or a similar method. The controller 42 stores and maintains a model 50 of the virtual visual space 20. The model may be provided to the controller 42 or determined by the controller 42. For example, sensors in input circuitry 44 may be used to create overlapping depth maps of the virtual visual space from different points of view and a three dimensional model may then be produced.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a position of the object.

At block 62 it is determined whether or not the model of the virtual visual space 20 has changed. If the model of the virtual visual space 20 has changed the method moves to block 66. If the model of the virtual visual space 20 has not changed the method moves to block 64.

At block 64 it is determined whether or not the point of view 24 in the virtual visual space 20 has changed. If the point of view 24 has changed the method moves to block 66. If the point of view 24 has not changed the method returns to block 62.

At block 66, a two-dimensional projection of the three-dimensional virtual visual space 20 is taken from the location 23 and in the direction 25 defined by the current point of view 24. The projection is then limited by the field of view 26 to produce the virtual visual scene 22. The method then returns to block 62.

Where the apparatus 30 enables augmented reality, the virtual visual space 20 comprises objects 11 from the real space 10 and also visual elements 28 not present in the real space 10. The combination of such visual elements 28 may be referred to as the artificial virtual visual space. FIG. 5B illustrates a method 70 for updating a model of the virtual visual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual visual space 20, changing the virtual visual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual visual space 20, changing the virtual visual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation by measuring a change in orientation of the user's head and/or a change in the user's direction of gaze.

In some but not necessarily all examples, the apparatus 30 comprises as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6B:
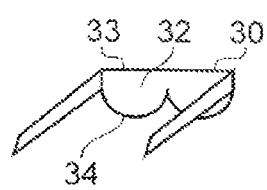

FIGS. 6A and 6B illustrate examples of apparatus 30 that enable display of at least parts of the virtual visual scene 22 to a user.

FIG. 6A illustrates a handheld apparatus 31 comprising a display screen as display 32 that displays images to a user and is used for displaying the virtual visual scene 22 to the user. The apparatus 30 may be moved deliberately in the hands of a user in one or more of the previously mentioned six degrees of freedom. The handheld apparatus 31 may house the sensors 45 for determining changes in the real point of view from a change in orientation of the apparatus 30.

The handheld apparatus 31 may be or may be operated as a see-video arrangement for augmented reality that enables a live or recorded video of a real visual scene 12 to be displayed on the display 32 for viewing by the user while one or more visual elements 28 are simultaneously displayed on the display 32 for viewing by the user. The combination of the displayed real visual scene 12 and displayed one or more visual elements 28 provides the virtual visual scene 22 to the user.

If the handheld apparatus 31 has a camera mounted on a face opposite the display 32, it may be operated as a see-video arrangement that enables a live real visual scene 12 to be viewed while one or more visual elements 28 are displayed to the user to provide in combination the virtual visual scene 22.

FIG. 6B illustrates a head-mounted apparatus 33 comprising a display 32 that displays images to a user. The head-mounted apparatus 33 may be moved automatically when a head of the user moves. The head-mounted apparatus 33 may house the sensors 45 for gaze direction detection and/or selection gesture detection.

The head-mounted apparatus 33 may be a see-through arrangement for augmented reality that enables a live real visual scene 12 to be viewed while one or more visual elements 28 are displayed by the display 32 to the user to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user while one or more visual elements 28 are simultaneously displayed by the display 32 for viewing by the user. The combination of the displayed real visual scene 12 and displayed one or more visual elements 28 provides the virtual visual scene 22 to the user. In this case a visor 34 is opaque and may be used as display 32.

Other examples of apparatus 30 that enable display of at least parts of the virtual visual scene 22 to a user may be used.

For example, one or more projectors may be used that project one or more visual elements to provide augmented reality by supplementing a real visual scene of a physical real world environment (real space).

For example, multiple projectors or displays may surround a user to provide virtual reality by presenting a fully artificial environment (a virtual visual space) as a virtual visual scene to the user.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in gesture recognition.

Figure 7A:
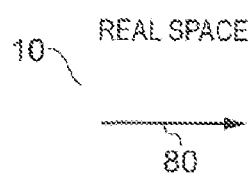
FIG. 7A, illustrates an example of a gesture in real space

Referring to FIG. 7A, a particular gesture 80 in the real space 10 is a gesture user input used as a 'user control' event by the controller 42 to determine what happens within the virtual visual space 20. A gesture user input is a gesture 80 that has meaning to the apparatus 30 as a user input.

Figure 7B:
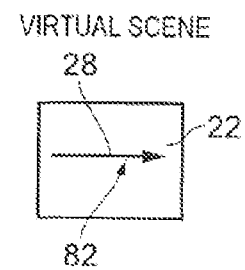
FIG. 7B, illustrates a corresponding representation rendered, in the virtual visual scene, of the gesture in real space.

Referring to FIG. 7B, illustrates that in some but not necessarily all examples, a corresponding representation of the gesture 80 in real space is rendered in the virtual visual scene 22 by the apparatus 30. The representation involves one or more visual elements 28 moving 82 to replicate or indicate the gesture 80 in the virtual visual scene 22.

A gesture 80 may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

A gesture 80 may be a non-contact gesture. A non-contact gesture does not contact the sensors at any time during the gesture.

A gesture 80 may be an absolute gesture that is defined in terms of an absolute displacement from the sensors. Such a gesture may be tethered, in that it is performed at a precise location in the real space 10. Alternatively a gesture 80 may be a relative gesture that is defined in terms of relative displacement during the gesture. Such a gesture may be un-tethered, in that it need not be performed at a precise location in the real space 10 and may be performed at a large number of arbitrary locations.

A gesture 80 may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement Δd with relative time Δt.

A gesture 80 may be performed in one spatial dimension (1D gesture), two spatial dimensions (2D gesture) or three spatial dimensions (3D gesture).

Figure 8:
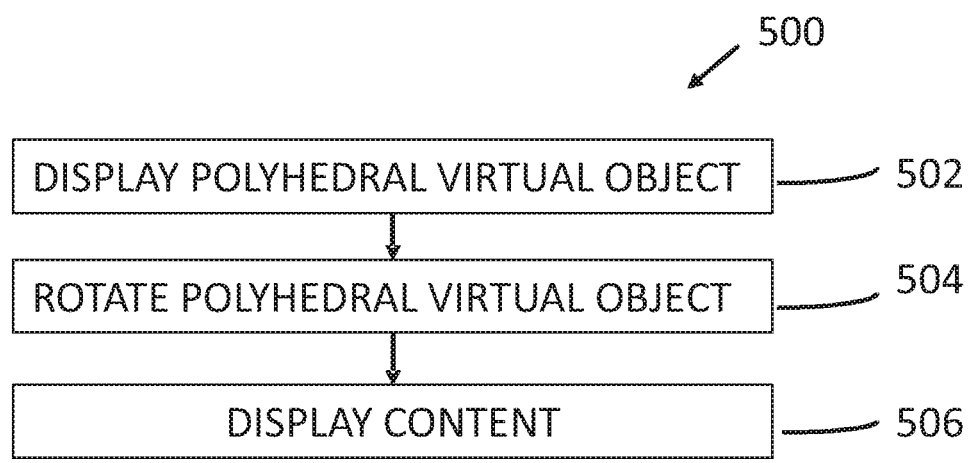
FIG. 8 illustrates an example of a method for selectively displaying content captured from different camera perspectives.

FIG. 8 illustrates an example of a method 500 for selectively displaying content $610_i$ captured from different camera perspectives $620_i$ and, in particular, content $610_i$ captured simultaneously of the same object or scene from different camera perspectives $620_i$.

Figure 9A:
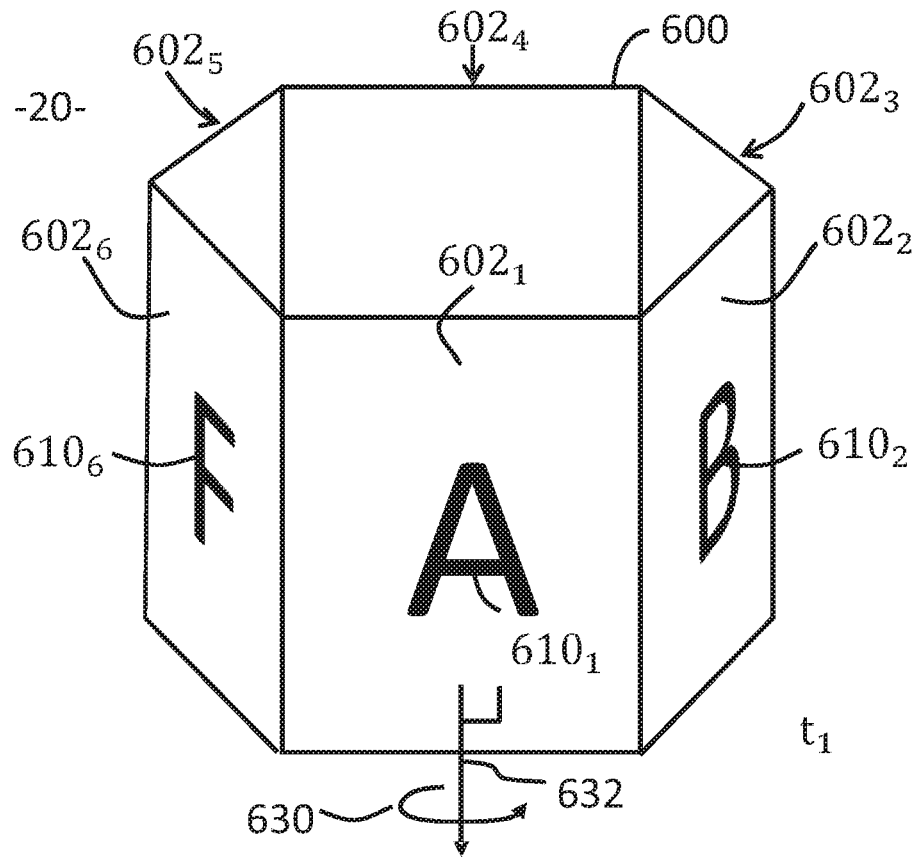
FIGS. 9A and 10A illustrates an example of a polyhedral virtual object at different times t1 and t2 respectively and FIGS. 9B and 10B illustrates examples of displayed content associated with the orientations of the polyhedral virtual object in FIGS. 9A and 10A respectively.
Figure 9B:
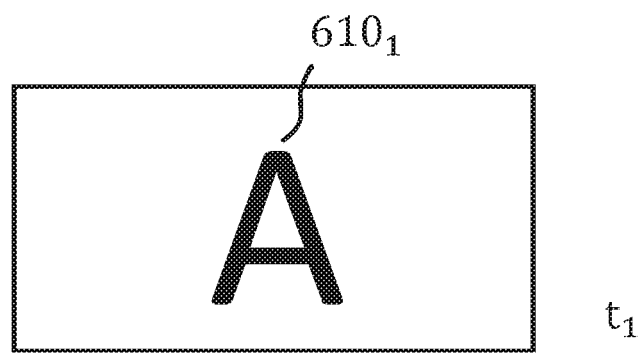
Figure 10A:
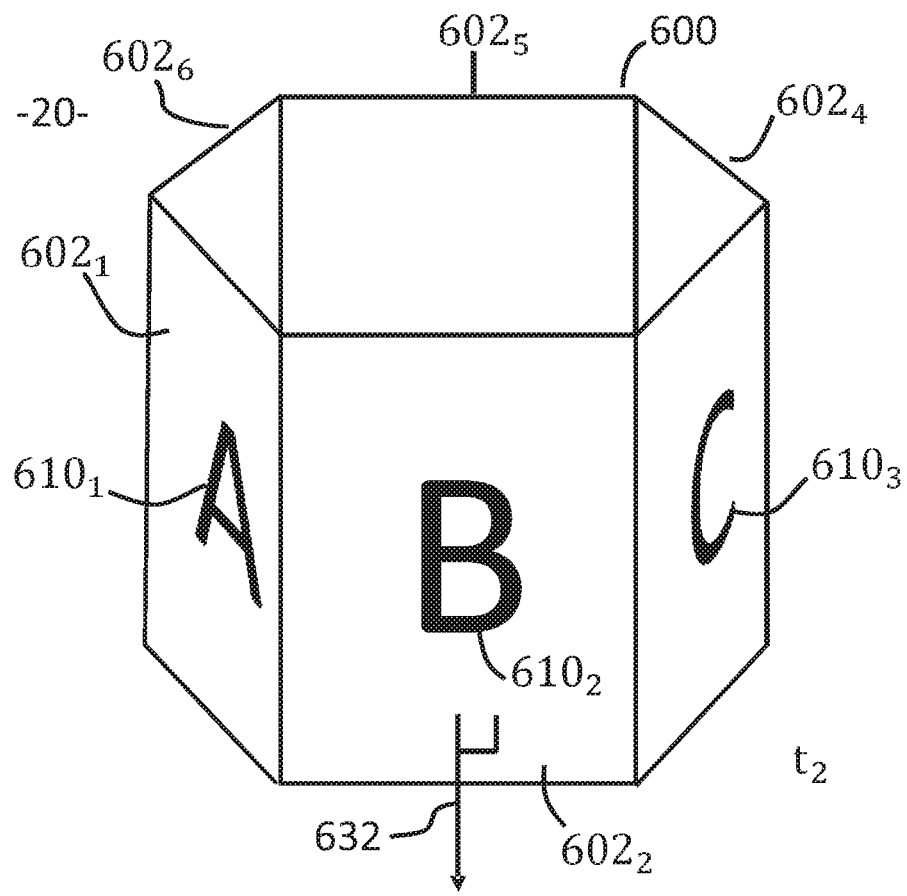
Figure 10B:
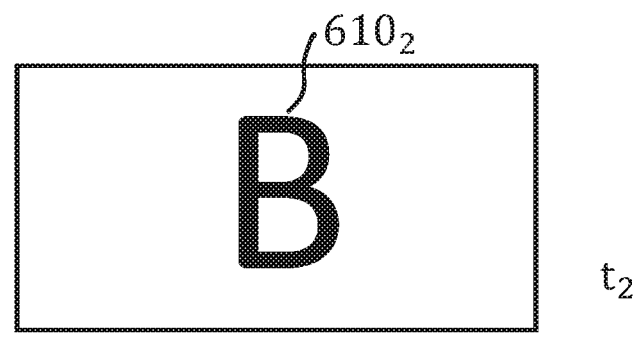

FIGS. 9A and 10A illustrates an example of a polyhedral virtual object 600 displayed in a virtual visual space 20 at different times t1 and t2 respectively. The polyhedral virtual object 600, has a first number (M) of faces $602_i$. Each of at least a second number (N) of the M faces $602_i$, displays content $610_i$ captured from an associated one of N different camera perspectives $620_i$. A particular orientation of the polyhedral virtual object 600 in the virtual visual space 20 is associated with a particular one of the different camera perspectives $620_i$ and the content $610_i$ captured from that camera perspective $620_i$. The content $610_i$ captured from that perspective $620_i$ is displayed, for example, as illustrated in FIGS. 9B and 10B for times t1 and t2 respectively.

Figure 11A:
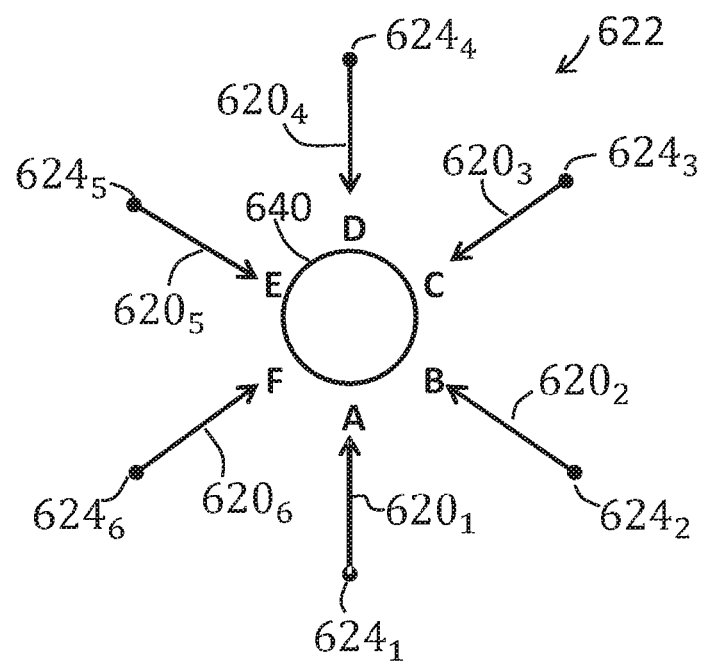
FIGS. 11A and 11B illustrate examples of different arrangements of cameras.
Figure 11B:
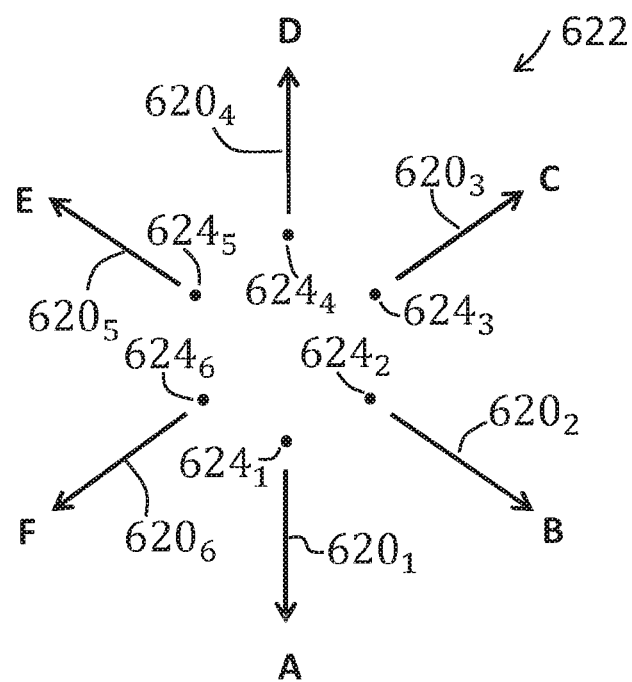

FIGS. 11A and 11B illustrate examples of different arrangements 622 of cameras $624_i$ each of which has a different perspective $620_i$. In the example of FIG. 11A, the cameras $624_i$ have an internal facing configuration and are all pointed inwards towards each other to capture simultaneously images of the same scene or object of interest 640 from different perspectives $620_i$. The content 610i captured from the associated N different camera perspectives 620i is content 610i relating to a common object of interest 640. In the example of FIG. 11B, the cameras $624_i$ have an external facing configuration and are all pointed outwards away from each other to capture simultaneously images of the same surrounding scene from different perspectives $620_i$. The content 610i captured from the associated N different camera perspectives 620i is content 610i relating to a common panoramic scene.

The method 500 comprises, as illustrated in FIG. 8, at block 502, causing display of a polyhedral virtual object 600, having a first number (M) of faces $602_i$, in a virtual visual space 20, wherein each of at least a second number (N) of the M faces $602_i$, displays content 610 captured from an associated one of N different camera perspectives $620_i$.

The method 500 also comprises, as illustrated in FIG. 8, at block 504, causing rotation 630 of the polyhedral virtual object in the virtual visual space 20 to select a particular face $602_1$ of the at least M faces $602_i$ of the polyhedral virtual object 600 by orienting the particular face $602_1$ in a predetermined direction 632 within the virtual visual space 20. An example of the polyhedral virtual object 600 is illustrated in FIG. 9A.

The method 500 also comprises, as illustrated in FIG. 8, at block 506, causing display of the content $610_1$ captured from the camera perspective $620_1$ associated with the selected face $602_1$ of the polyhedral virtual object 600.

The method 500 may be repeated.

The method comprises, as illustrated in FIG. 8, at block 502, causing display of the same polyhedral virtual object 600, having a first number (M) of faces $602_i$, in a virtual visual space 20, wherein each of at least a second number (N) of the M faces $602_i$, displays content 610 captured from an associated one of N different camera perspectives $620_i$.

The method 500 also comprises, as illustrated in FIG. 8, at block 504, causing rotation 630 of that polyhedral virtual object 600 in the virtual visual space 20 to select a different face $602_2$ of the at least M faces $602_i$ of the polyhedral virtual object 600 by orienting the different face $602_2$ in the same predetermined direction 632 within the virtual visual space 20. An example of the polyhedral virtual object 600 is illustrated in FIG. 10B.

The method 500 also comprises, as illustrated in FIG. 8, at block 506, causing display of the content $610_2$ captured from the camera perspective $620_2$ associated with the selected face $602_2$ of the polyhedral virtual object 600.

In FIG. 9A, the polyhedral virtual object 600 is rotated in the virtual visual space 20 to select the face $602_1$ of the at least M faces $602_i$ of the polyhedral virtual object 600 by orienting that face $602_1$ in the predetermined direction 632 within the virtual visual space 20. The content $610_1$ (e.g. A) captured from the camera perspective $620_1$ associated with the selected face $602_1$ of the polyhedral virtual object 600 is displayed, for example, as illustrated in FIG. 9B.

In this example, but not necessarily all examples, orienting a face $602_i$ of the polyhedral virtual object 600 in the predetermined direction 632 within the virtual visual space 20 comprises orienting that face $602_i$ so that it is the closest of the faces $602_i$ of the polyhedral virtual object 600 to the user. However, in other examples the predetermined direction may be selected by a user by for example selecting a particular face $602_i$ of the polyhedral virtual object.

In FIG. 10A, the polyhedral virtual object 600 is rotated in the virtual visual space 20 to select the face $602_2$ of the at least M faces $602_i$ of the polyhedral virtual object 600 by orienting that face $602_2$ in the predetermined direction 632 within the virtual visual space 20. The content $610_2$ (e.g. B)

captured from the camera perspective $620_2$ associated with the selected face $602_2$ of the polyhedral virtual object 600 is displayed, for example, as illustrated in FIG. 10B.

In this example, but not necessarily all examples, orienting a face $602_i$, the polyhedral virtual object 600 in the predetermined direction 632 within the virtual visual space 20 comprises orienting that face $602_i$ so that it is the closest of the faces $602_i$ of the polyhedral virtual object 600 to the user.

The polyhedral virtual object 600 has an apparent shape in the virtual visual space 20 of a polyhedron. The polyhedral virtual object 600 is a representation of a three dimensional shape that has flat polygonal faces, straight edges, and sharp vertices.

In the examples illustrated in FIGS. 9A, 9B but not necessarily all examples, the polyhedral virtual object 600 has an apparent shape in the virtual visual space 20 of a prism. A prism is a polyhedron with a multiple sided simple polygonal base face.

In the examples illustrated in FIGS. 9A, 9B but not necessarily all examples, the polyhedral virtual object 600 has an apparent shape in the virtual visual space 20 of a right prism. A right prism is a polyhedron with a multiple sided simple polygonal base face, and polygonal side faces each of which is perpendicular to the base face and is connected to a different edge of the base face.

In the examples illustrated in FIGS. 9A, 9B but not necessarily all examples, the polygonal base face is convex (internal angles between edges at vertices is less than 180°).

In the examples illustrated in FIGS. 9A, 9B but not necessarily all examples, the polygonal base face is equiangular (internal angles between edges at vertices is the same).

In the examples illustrated in FIGS. 9A, 9B but not necessarily all examples, the polygonal base face is cyclic (vertices of the polygonal base face lie on a circle).

In the examples illustrated in FIGS. 9A, 9B but not necessarily all examples, the polygonal base face is equilateral (edges of the polygonal base face have the same length).

In the examples illustrated in FIGS. 9A, 9B but not necessarily all examples, the polygonal base face is regular (both equiangular and equilateral)

In the examples illustrated in FIGS. 9A, 9B but not necessarily all examples, the polygonal base face has N edges that is an edge for each camera perspective. Each side face connected to an edge displays content associated with a particular perspective.

In other examples, the polygonal base face may have more than N edges and there is one or more edges not associated with a used camera perspective. Only N of the side faces connected to the edges display content associated with a particular camera perspective.

The polyhedral virtual object 600 provides a user interface for outputting information to a user and/or for allowing a user to input commands.

In some but not necessarily all examples, the polyhedral virtual object 600 is a user output object that informs the user, when the displayed content $620_i$, rotates, how the camera perspective associated with that content has rotated. This rotation in perspective is indicated by a rotation of the polyhedral virtual object 600. In some but not necessarily all examples, the rotation in perspective is indicated by a rotation of the same amount of the polyhedral virtual object 600.

In some but not necessarily all examples, the polyhedral virtual object 600 may alternatively or additionally be a user input object. The user changes the orientation of the polyhedral virtual object 600 by rotating the polyhedral virtual object 600. This rotates the displayed content $620_i$ so that the content $620_i$ associated with the new selected perspective/orientation/face oriented in the predetermined direction 632 is displayed. This change is perspective is caused by a rotation of the polyhedral virtual object 600. In some but not necessarily all examples, the rotation in perspective is the same amount as a rotation of the polyhedral virtual object 600.

The rotation of the polyhedral virtual object 600 may be a user-interactive virtual object in which case rotation of the polyhedral virtual object 600 is caused by user actions within the virtual visual space 20. For example, the user may touch/grab the polyhedral virtual object 600 within the virtual visual space 20 and manipulate its orientation within the virtual space 20 by rotating it. Where the polyhedral virtual object 600 is a right prism, the axis or rotation is perpendicular to the base face of the right prism and parallel to the side faces of the right prism.

Figure 12A:
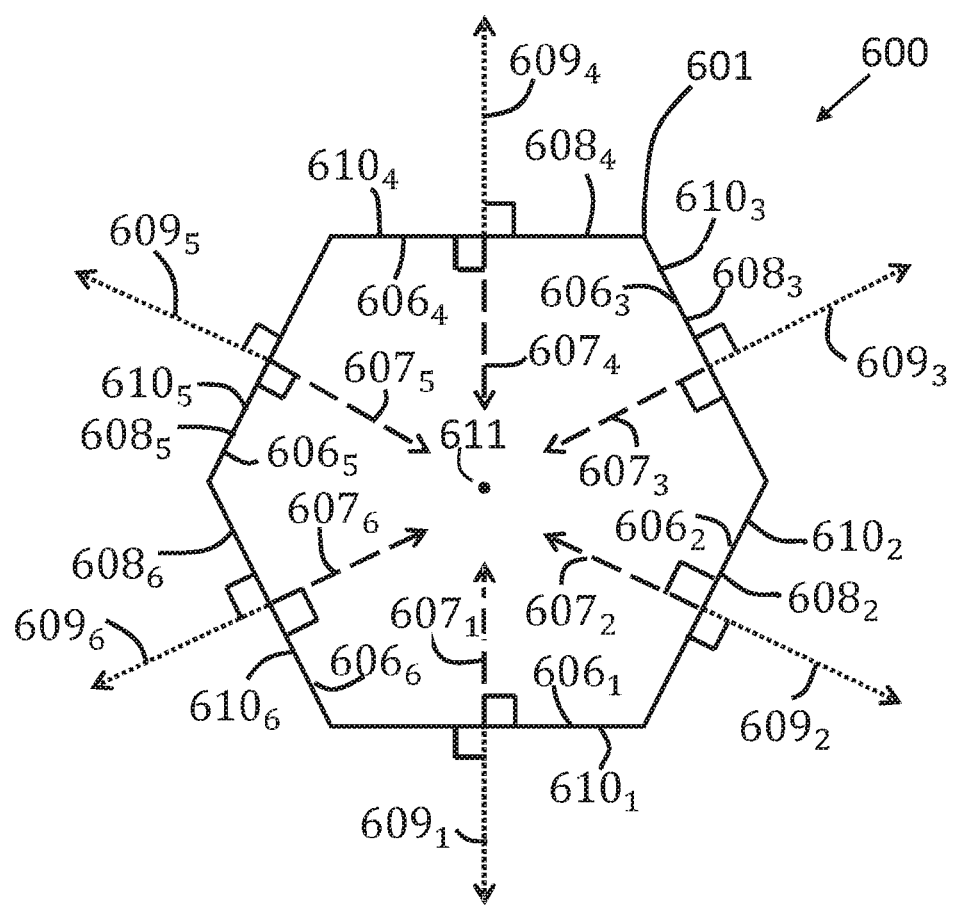
FIG. 12A illustrates a base of an example of the polyhedral virtual object used to generate the right prism illustrated in FIGS. 12B, 12C at different orientations'
Figure 12B:
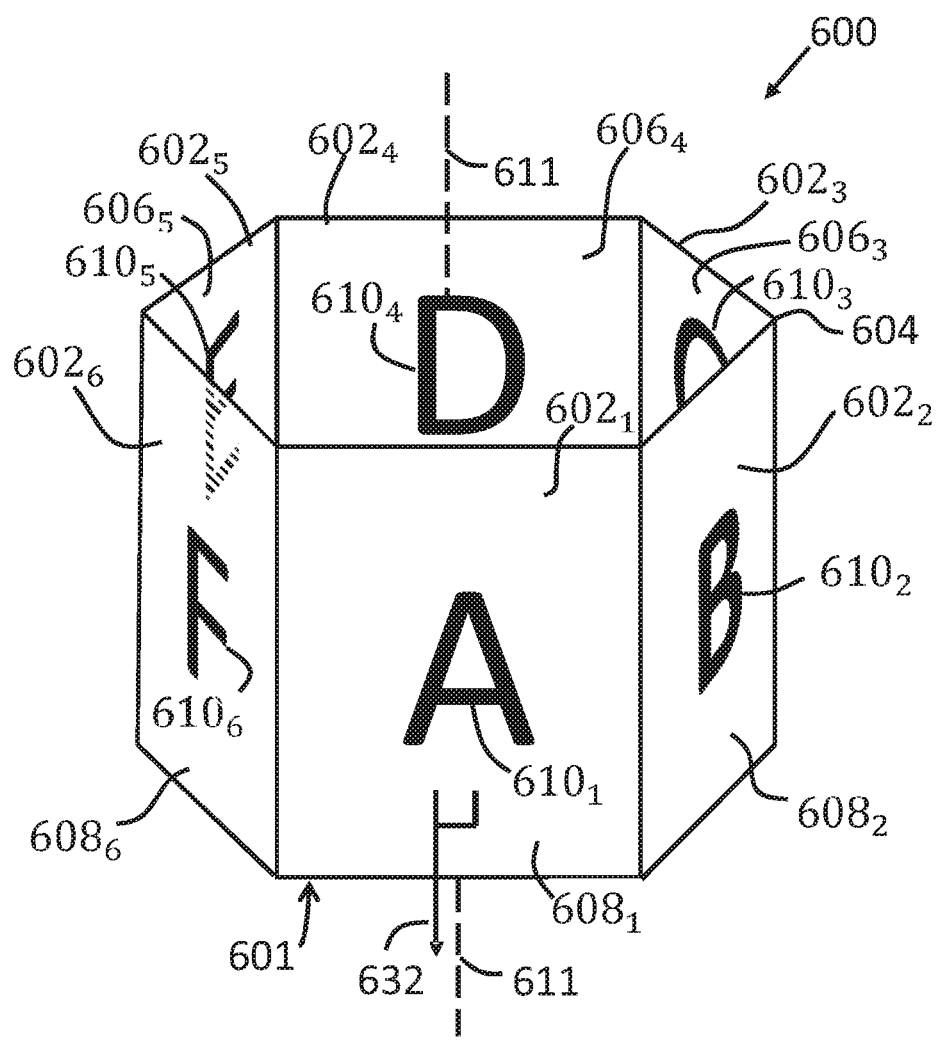
Figure 12C:
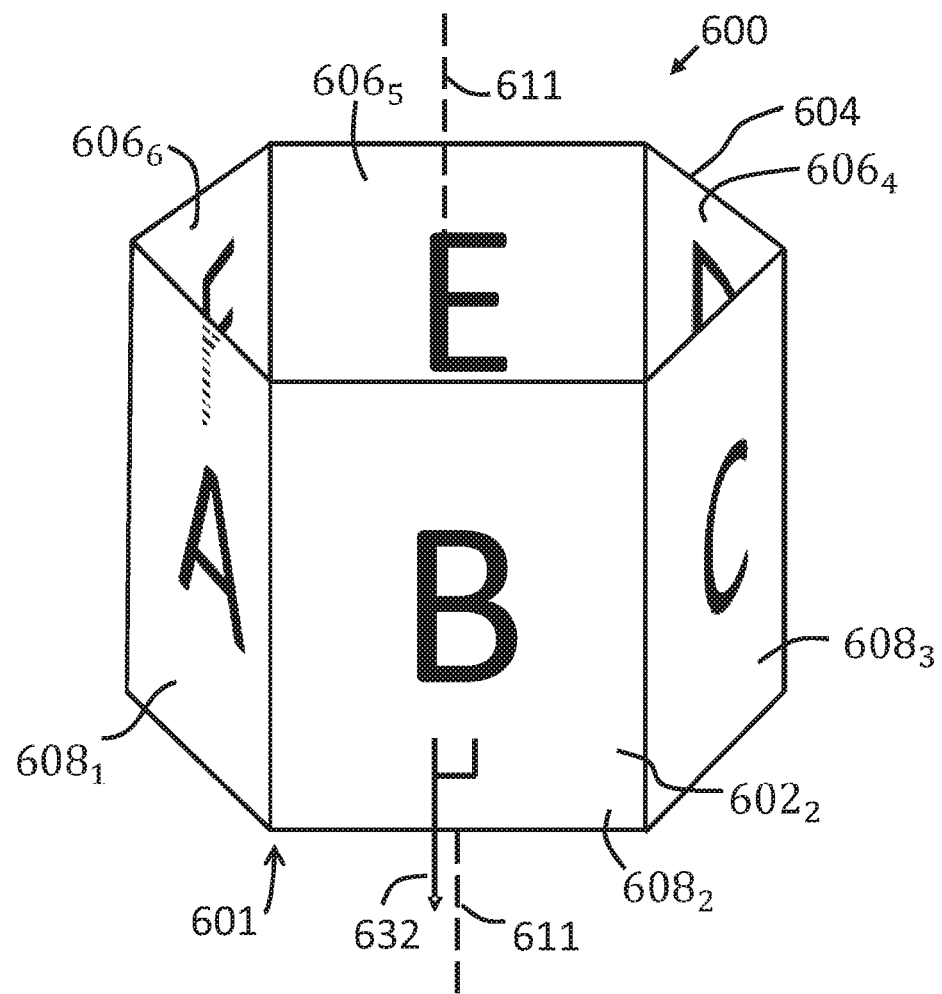

In the examples illustrated in FIGS. 12A, 12B, 12C but not necessarily all examples, the polyhedral virtual object 600 has an apparent shape in the virtual visual space 20 of a right prism with a multiple sided regular polygonal base face 601. FIG. 12A illustrates the regular polygonal base plate 601 in plan view. FIGS. 12B, 12C illustrates a perspective view of the polyhedral virtual object 600 as seen by the user from within the virtual visual space 20 when the polyhedral virtual object 600 has different orientations.

The polyhedral virtual object 600, has a first number (M) of side faces $602_i$. Each of at least a second number (N) of the M side faces $602_i$, displays content $610_i$ captured from an associated one of N different camera perspectives $620_i$.

The polyhedral virtual object 600 is a frame 604. Each face $602_i$ has an interior side $606_i$ defined by an internally extending normal vector $607_i$ and an exterior side $608_i$ defined by an externally extending normal vector $609_i$.

Each of the side faces $602_i$ displays to the user content $610_i$ (if any) captured from an associated one of different camera perspectives $620_i$. There are N different camera perspectives $620_i$ and at least N side faces $602_i$.

The content $610_i$ is displayed to the user, in the virtual visual space 20, either on an interior side $606_i$ or an exterior side $608_i$, of the appropriate face $602_i$ in dependence upon whether the internally extending vector $607_i$ for that face $602_i$ or the externally extending vector $609_i$ for that face $602_i$ approaches closest to the user in the virtual visual space 20.

The content $610_i$ displayed on a face $602_i$ can be switched between display to the user on an interior side $606_i$ of the face $602_i$ or display to the user on an exterior side $608_i$ of a face $602_i$ by rotation of the polyhedral virtual object 600.

It can be seen in FIG. 12B, that the face $602_1$ is oriented in the predetermined direction 632. The three closest faces to the user $602_6$, $602_1$, $602_2$, have their respective content $610_6$, $610_1$, $610_2$, displayed on the respective exterior sides $608_6$, $608_1$, $608_2$, of the polyhedral virtual object 600. The three most distant faces to the user $602_3$, $602_4$, $602_5$, have their respective content $610_3$, $610_4$, $610_5$, displayed on the respective interior sides $606_3$, $606_4$, $606_5$ of the polyhedral virtual object 600.

Because of the frame (see-through) structure of the polyhedral virtual object 600 (no content is displayed on the bases which are transparent), it is possible to view at least part of the content $610_3$, $610_4$, $610_5$, displayed on the respective interior sides $606_3$, $606_4$, $606_5$ of the polyhedral virtual object 600. In some examples, the content $610_3$, $610_4$, $610_5$, displayed on the interior sides $606_3$, $606_4$, $606_5$ of the polyhedral virtual object 600 is limited to areas which are directly visible to the user without looking through a side face of the polyhedral virtual object 600 that is displaying content 610. The polyhedral virtual object 600 may be tilted (axis of rotation 611 tilted) by a user by actions in the virtual visual space to increase the size of the areas of the interior sides $606_3$, $606_4$, $606_5$ of the polyhedral virtual object 600 which are directly visible to the user and thereby increase the content $610_3$, $610_4$, $610_5$ visible to the user.

It can be seen in FIG. 12C, that the polyhedral virtual object 600 has been rotated 60° about an axis of rotation 611. The face $602_2$ is oriented in the predetermined direction 632. The three closest faces to the user $610_1$, $610_2$, $610_3$, have their respective content $610_1$, $610_2$, $610_3$, displayed on the respective exterior sides $608_1$, $608_2$, $608_3$, of the polyhedral virtual object 600. The three most distant faces to the user $610_4$, $610_5$, $610_6$, have their respective content $610_4$, $610_5$, $610_6$, displayed on the respective interior sides $606_4$, $606_5$, $606_6$ of the polyhedral virtual object 600.

Because of the frame (see-through) structure of the polyhedral virtual object 600 (no content is displayed on the bases which are transparent), it is possible to view at least part of the content $610_4$, $610_5$, $610_6$, displayed on the respective interior sides $606_4$, $606_5$, $606_6$ of the polyhedral virtual object 600. In some examples, the content $610_4$, $610_5$, $610_6$, displayed on the interior sides $606_4$, $606_5$, $606_6$ of the polyhedral virtual object 600 is limited to areas which are directly visible to the user without looking through a side face of the polyhedral virtual object 600 that is displaying content 610. The polyhedral virtual object 600 may be tilted (axis of rotation 611 tilted) by a user by actions in the virtual visual space 20 to increase the size of the areas of the interior sides $606_4$, $606_5$, $606_6$ of the polyhedral virtual object 600 which are directly visible to the user and thereby increase the content $610_4$, $610_5$, $610_6$ visible to the user.

Figure 13A:
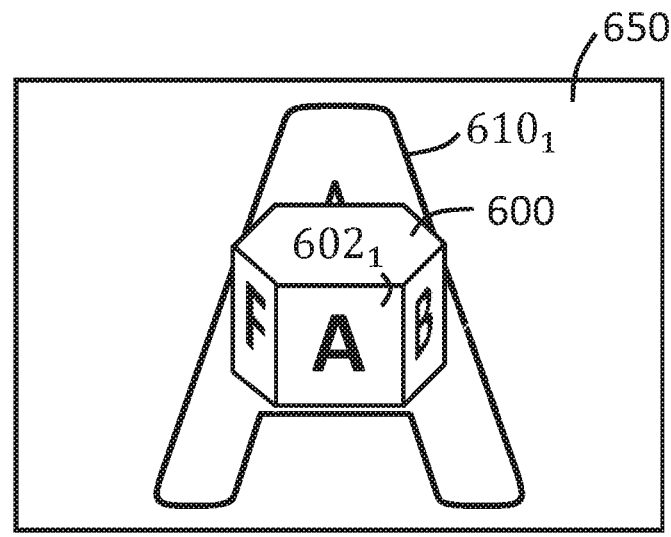
FIGS. 13A and 13B illustrate examples of displaying content captured from the camera perspective associated with a selected face of the polyhedral virtual object.
Figure 13B:
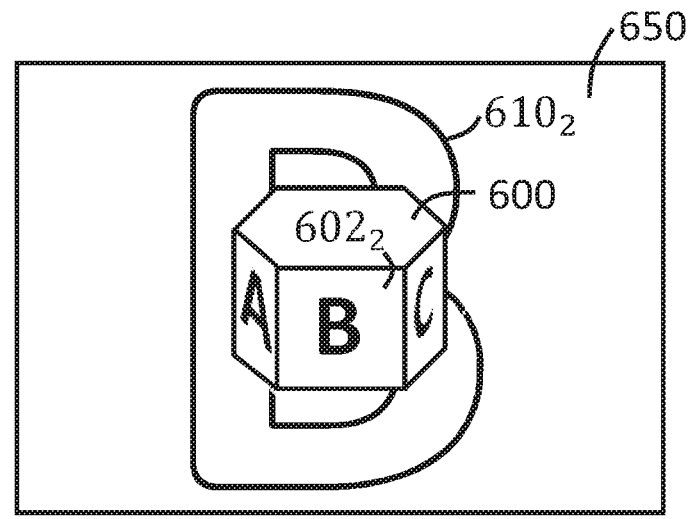

FIGS. 13A and 13B illustrate examples of displaying content $610i$ captured from the camera perspective associated with a selected face of the polyhedral virtual object 600.

In FIG. 13A, the selected face is face $602_1$. This causes the display of content $610_1$ as a panorama 650. The content $610_1$ may be displayed as a panorama 650 behind the polyhedral virtual object 600. After a predetermined time the polyhedral virtual object may 600 disappear.

The panorama 650 may have a higher resolution than the content $610_1$ displayed on the selected face $602_1$. The panorama 650 may have a greater, wider, field of view than the content $610_1$ displayed on the selected face $602_1$.

In FIG. 13B, the selected face is face $602_2$. This causes the display of content $610_2$ as a panorama 650. The content $610_2$ may be displayed as a panorama 650 behind the polyhedral virtual object 600. After a predetermined time the polyhedral virtual object may 600 disappear.

The panorama 650 may have a higher resolution than the content $610_2$ displayed on the selected face $602_2$. The panorama 650 may have a greater, wider, field of view than the content $610_2$ displayed on the selected face $602_2$.

The polyhedral virtual object 600 may have a shape dependent upon the different camera perspectives $620_i$. The shape may be generated biased upon the different camera perspectives $620_i$.

For example, the polyhedral virtual object 600 may be generated as a polyhedron having a shape dependent upon the number of different camera perspectives $620_i$ and/or dependent upon an angular distribution of the different camera perspectives $620_i$.

Figure 14A:
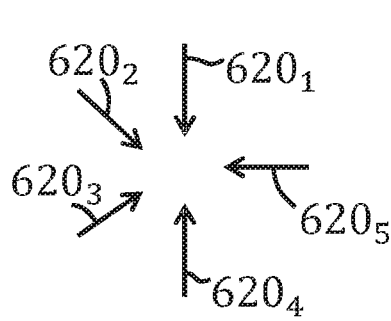
FIGS. 14A, 14B illustrate examples of non-symmetric camera perspectives
Figure 14B:
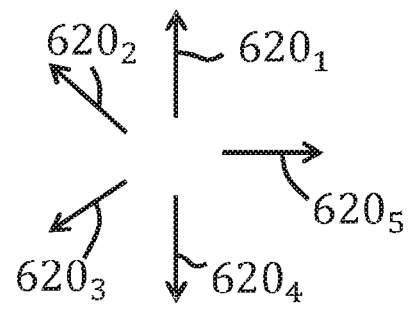

In the preceding examples, the polyhedral virtual object 600 has been illustrated in the FIGS. as a right prism with a regular base face 601. FIGS. 14A, 14B illustrate examples of non-symmetric camera perspectives $620_i$ and FIGS. 15A-15E illustrate different examples of polygonal bases 601 that may be used to generate a suitable polyhedral virtual object 600, for example as a right prism with that base 601.

In this way a polyhedral virtual object 600 can be generated as a polyhedron having a shape that is a 'best-fit' prism with a polygonal base 601. The polygonal base 601 has a multiple number of sides, each of which subtends an internal central angle of the polygonal base 601. The multiple number of sides and the internal central angles of the polygonal base are selected such that the cumulative total of the internal central angles is 360°.

In each of FIGS. 15A-15E the polygonal base face 601 is convex (internal angles between edges at vertices is less than 180°) and cyclic (vertices of the polygonal base face lie on a circle).

Figure 15A:
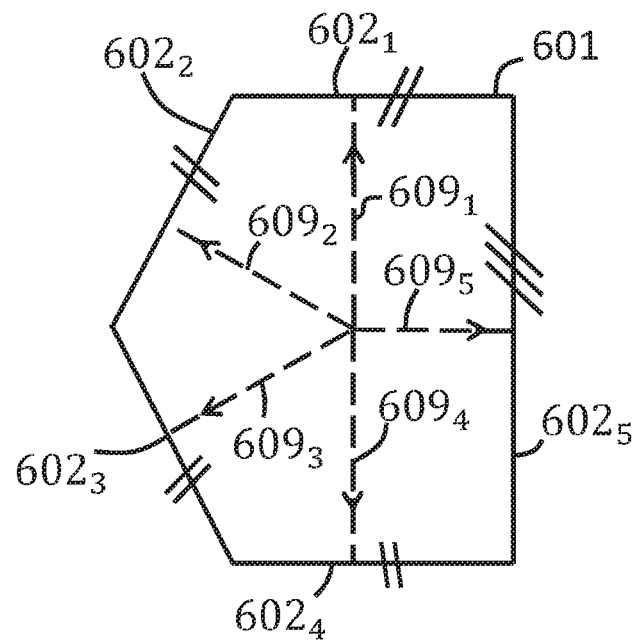
FIGS. 15A-15E illustrate different examples of polygonal bases that may be used to generate a suitable polyhedral virtual object for those camera perspectives and their associated content.
Figure 15B:
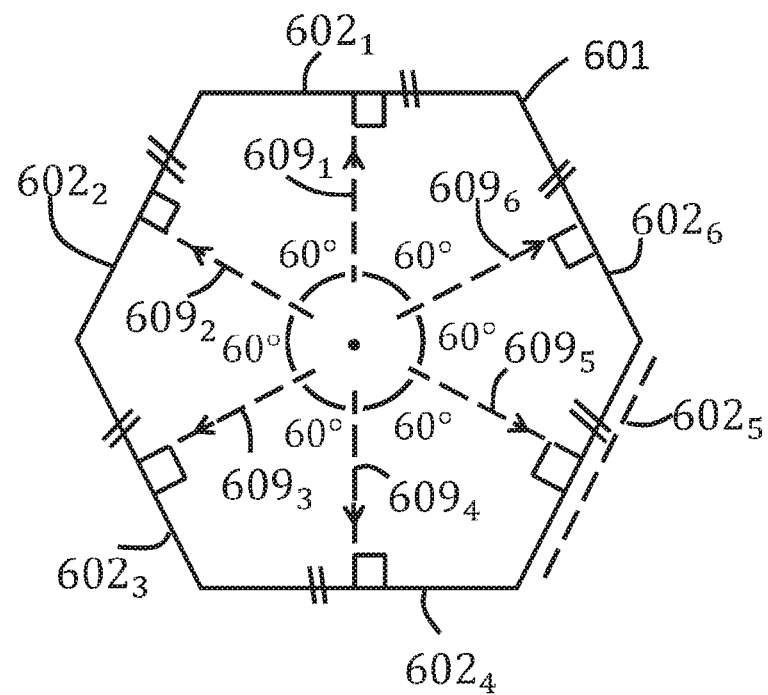
Figure 15C:
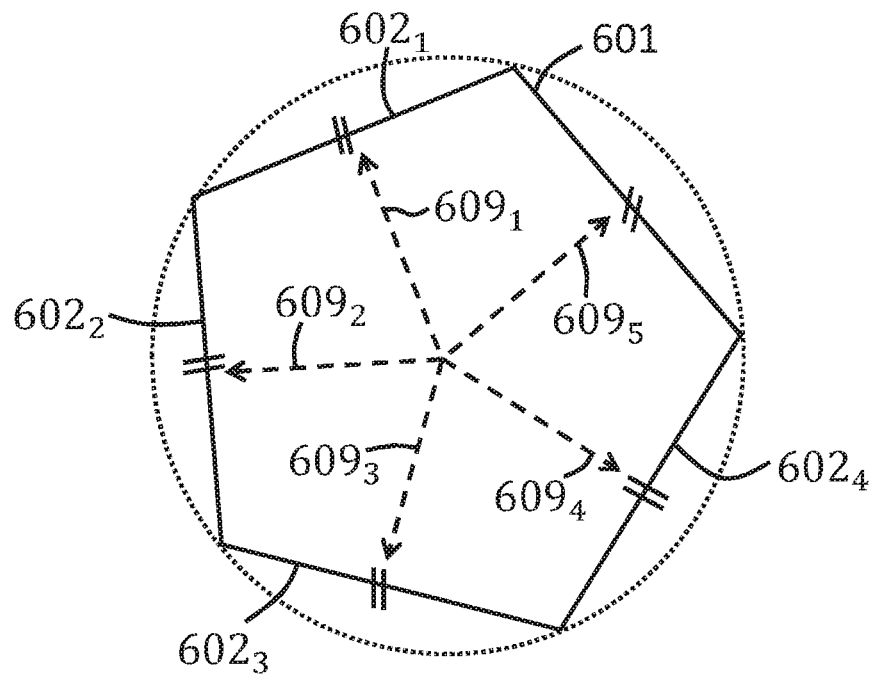
Figure 15D:
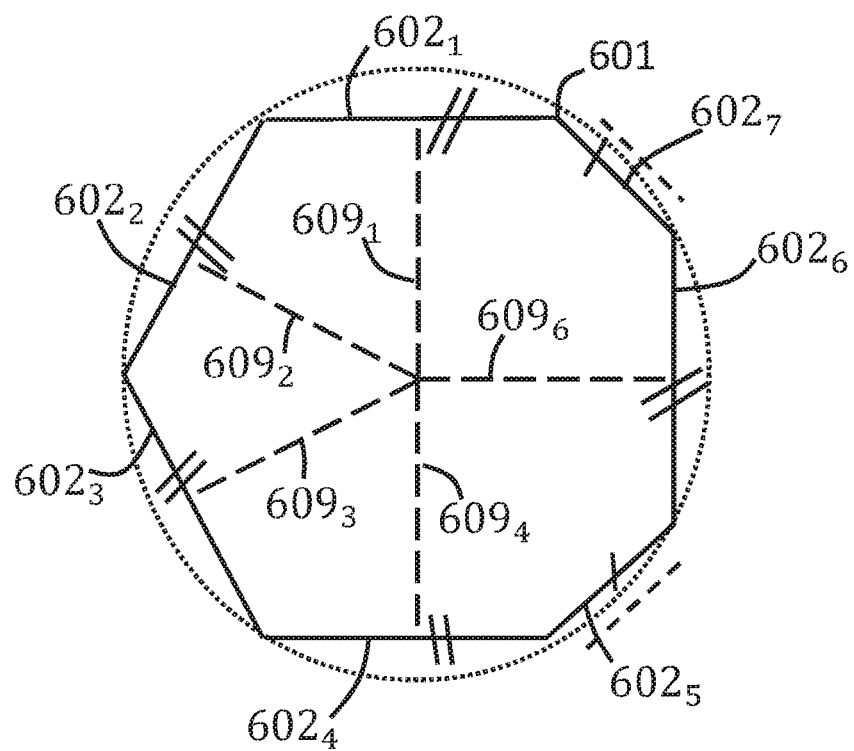
Figure 15E:
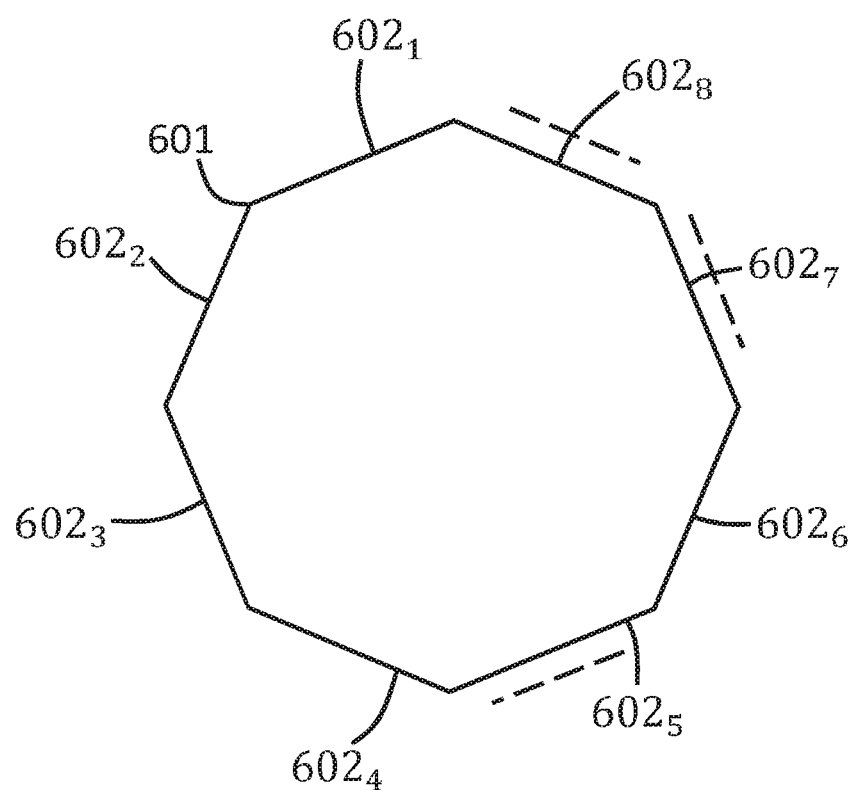

In FIGS. 15B, 15C, 15E the polygonal base face 601 is regular (both equiangular and equilateral). Each side/edge has the same length and subtends the same internal central angle.

In FIGS. 15A, 15C each side face connected to an edge of the base 601 displays content associated with a particular perspective.

In FIGS. 15B, 15D, FIG. 15E only a sub-set of the side faces connected to the edges of the base 601 display content associated with a particular camera perspective.

In FIGS. 15A, 15D each of the side faces $602i$ of the polyhedral virtual object (right prism) 600 is defined by an externally extending normal vector $609_i$ as previously described (not illustrated in these figs). Each camera perspective $620_i$ is aligned with a normal vector $609_i$.

In FIG. 15A, each of the side faces $602i$ of the polyhedral virtual object (right prism) 600 is defined by an externally extending normal vector $609_i$ aligned with a different, used, camera perspective $620_i$. That is there is a one-to-one mapping between side faces $602_i$ and, used, camera perspectives $620_i$. There are no side faces of the polyhedral virtual object (right prism) 600 not used to display content associated with a camera perspective $620_i$. This base 601 may be used to generate a polygonal virtual object 600 where a constraint is that all side faces 602 of a right prism polygonal virtual object 600 should be associated with and aligned with a camera perspective.

FIG. 15B illustrates a hexagonal base 601 with one unused side face $602_5$ that does not display content associated with a camera perspective $620_i$. Of the remaining five side faces, four have normal vectors 609 aligned with respective camera perspectives that captured content displayed on the respective faces. The other side face $602_6$ has a normal vector $609_6$ misaligned with a respective camera perspective $620_5$ that captured content displayed on that face. This base 601 may be used to generate a polygonal virtual object 600 where a constraint is that a maximum number, but not necessarily all, side faces of a regular right prism polygonal virtual object 600 should have normal vectors aligned with camera perspectives.

FIG. 15C illustrates a heptagonal base 601 with no unused side faces. All the side faces 602 display content associated with a camera perspective 620. Of the five side faces, not all have a normal vector 609 aligned with a respective camera perspective 620 that captured content displayed on that face. Side faces 602 may have normal vectors 609 misaligned with the respective camera perspectives 620 that captured content 610 displayed on the respective faces 602. This base 601 may be used to generate a polygonal virtual object 600 where a constraint is that all side faces 602 of a regular right prism polygonal virtual object 600 should be associated with a camera perspective.

In FIG. 15D only some of the side faces 602$i$ of the polyhedral virtual object (right prism) 600 have externally extending normal vectors 609$_i$ aligned with a different, used, camera perspectives 620$_i$. Some of the side faces 602$i$ (e.g. 602$_5$, 602$_7$) of the polyhedral virtual object (right prism) 600 are unused. In this example each of the used side faces 602 is equilateral (same length) and has a normal vector 609 aligned with a camera perspective 620.

FIG. 15E illustrates an octagonal base 601 with three unused side faces 602$_5$ 602$_7$ 602$_8$ that do not display content 610 associated with a camera perspective 620. Of the remaining five side faces, some may have normal vectors aligned with respective camera perspectives that captured content displayed on the respective faces, while other side faces may have normal vectors misaligned with a respective camera perspective that captured content displayed on those faces. This base 601 may be used to generate a polygonal virtual object 600 where a constraint is that a maximum misalignment of any one face with a camera perspective that captured content displayed on that face is less than a minimum threshold e.g. 20°

The base of the polyhedral virtual object (right prism) 600 may have the following number of sides (and central subtended angles in degrees): 3 (120), 4(90), 5(72), 6(60), 8(45), 9(40), 10(36), 12(30), 15(24), 18(20).

An algorithm may be used to generate the polyhedral virtual object 600. The algorithm may seek to minimize a cost function subject to applied constraints. The cost function may, for example, increases with the number of unused faces 602$i$, and/or increase with a measure of misalignment of a normal vector of faces 602$i$ from real camera perspectives 620$i$. The measure of misalignment may, for example be the number of misalignments and/or the cumulative total of misalignments and/or the maximum misalignment and/or the number of misalignments over a threshold vale.

Additional constraints may be that the polyhedral virtual object 600 is a prism, and/or that the prism is a right prism and/or that the prism has a cyclic base 601 and or that the prism has a equiangular base and/or that the prism has a equilateral base and/or that the prism has a regular base.

The blocks illustrated in the FIGS. 8 to 15 may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The preceding description describes, in relation to FIGS. 1 to 15, a system, apparatus 30, method 60 and computer program 48 that enables control of a virtual visual space 20 and the virtual visual scene 26 dependent upon the virtual visual space 20.

In the foregoing examples, reference has been made to a computer program or computer programs. A computer program, for example computer program 48 may be configured to perform the method 500.

Also as an example, an apparatus 30 may comprises:
at least one processor 40; and
at least one memory 46 including computer program code
the at least one memory 46 and the computer program code configured to, with the at least one processor 40, cause the apparatus 40 at least to perform:
causing display of a polyhedral virtual object, having a first number (M) of faces, in a virtual visual space, wherein each of at least a second number (N) of the M faces, displays content captured from an associated one of N different camera perspectives;
causing rotation of the polyhedral virtual object in the virtual visual space to select a first face of the at least M faces of the polyhedral virtual object by orienting the first face in a predetermined direction within the virtual visual space; and
causing display of the content captured from the camera perspective associated with the selected first face of the polyhedral virtual object.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

It will be appreciated from the foregoing that the various methods 500 described may be performed by an apparatus 30, for example an electronic apparatus 30.

In some examples, the placement of the head-mounted apparatus 33 onto the head of a user may cause the system to perform or to be able to perform the method 500 illustrated in FIG. 8. That is, while the head-mounted apparatus 33 is not placed on a head of a user, the method 500 is not operational. When the head-mounted apparatus is placed on a head of a user, the method 500 becomes operational enabling control of a sound scene using first perspective, user-interactive, mediated reality (virtual reality or augmented reality).

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks, steps and processes illustrated in the FIGS. 8-15E may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 may, for example be a module. The apparatus may be a module. The display 32 may be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   determining a first number (N) of different camera perspectives;
   generating a polyhedral virtual object as a polyhedron having a polygonal base with a number of sides equal to the N number of different camera perspectives, where a shape of the polyhedral virtual object is dependent upon an angular distribution of the different camera perspectives;
   causing display of the polyhedral virtual object in a virtual visual space, wherein each of at least N faces displays content captured from an associated one of the N different camera perspectives;
   causing rotation of the polyhedral virtual object in the virtual visual space to select a first face of the at least N faces of the polyhedral virtual object, where the causing rotation comprises orienting the first face in a predetermined direction within the virtual visual space; and
   causing display of the content captured from the camera perspective associated with the selected first face of the polyhedral virtual object.

2. A method as claimed in claim 1, wherein the content captured from the associated N different camera perspectives is content relating to a common object of interest.

3. A method as claimed in claim 1, wherein the polyhedral virtual object is a user-interactive virtual object and wherein rotation of the polyhedral virtual object is caused with user actions within the virtual visual space.

4. A method as claimed in claim 1, wherein the polyhedral virtual object is a frame wherein each face has an interior side defined with an internally extending normal vector and an exterior side defined with an externally extending normal vector, wherein each of the at least N faces displays to a user the content captured from the associated one of the N different camera perspectives either on an interior side or an exterior side, in dependence upon whether the internally extending normal vector for that face or the externally extending normal vector for that face approaches closest to the user in the virtual visual space, wherein the content displayed on any of the at least N faces can be switched between display to the user on the interior side of the face or display to the user on the exterior side of the face with rotation of the polyhedral virtual object.

5. A method as claimed in claim 1, wherein causing display of the content captured from the camera perspective associated with the selected first face of the polyhedral virtual object causes display of the content as a panorama.

6. A method as claimed in claim 5, wherein the panorama is displayed behind the polyhedral virtual object.

7. A method as claimed in claim 1, wherein orienting the first face in the predetermined direction within the virtual visual space comprises orienting the first face so that it is the closest of the at least N faces to a user.

8. A method as claimed in claim 1, wherein the polyhedron is a best-fit prism.

9. A computer program product embodied on a non-transitory computer readable storage medium, comprising computer program code configured to, when executed on at least one processor, cause an apparatus to:
   determine a first number (N) of different camera perspectives;

generate a polyhedral virtual object as a polyhedron having a polygonal base with a number of sides equal to the N number of different camera perspectives, where a shape of the polyhedral virtual object is dependent upon an angular distribution of the different camera perspectives;

cause display of the polyhedral virtual object in a virtual visual space, wherein each of at least N faces displays content captured from an associated one of the N different camera perspectives;

cause rotation of the polyhedral virtual object in the virtual visual space to select a first face of the at least N faces of the polyhedral virtual object, where causing rotation comprises orienting the first face in a predetermined direction within the virtual visual space; and cause display of the content captured from the camera perspective associated with the selected first face of the polyhedral virtual object.

10. An apparatus comprising at least one processor and at least one non-transitory memory including computer program code, the at least one non-transitory memory and the computer program code configured to, with the at least one processor, cause the apparatus at least to perform:

determine a first number (N) of different camera perspectives;

generate a polyhedral virtual object as a polyhedron having a polygonal base with a number of sides equal to the N number of different camera perspectives, where a shape of the polyhedral virtual object is dependent upon an angular distribution of the different camera perspectives;

cause display of the polyhedral virtual object in a virtual visual space, wherein each of at least N faces displays content captured from an associated one of the N different camera perspectives;

cause rotation of the polyhedral virtual object in the virtual visual space to select a first face of the at least N faces of the polyhedral virtual object, where causing rotation comprises orienting the first face in a predetermined direction within the virtual visual space; and cause display of the content captured from the camera perspective associated with the selected first face of the polyhedral virtual object.

11. The apparatus as claimed in claim 10, wherein the content captured from the associated N different camera perspectives is content relating to a common object of interest.

12. The apparatus as claimed in claim 10, wherein the polyhedral virtual object is a user-interactive virtual object and wherein rotation of the polyhedral virtual object is caused with user actions within the virtual visual space.

13. The apparatus as claimed in claim 10, wherein the polyhedral virtual object is a frame wherein each face has an interior side defined with an internally extending normal vector and an exterior side defined with an externally extending normal vector, wherein each of the at least N faces displays to a user the content captured from the associated one of the N different camera perspectives either on an interior side or an exterior side, in dependence upon whether the internally extending normal vector for that face or the externally extending normal vector for that face approaches closest to the user in the virtual visual space, wherein the content displayed on any of the at least N faces can be switched between display to the user on the interior side of the face or display to the user on the exterior side of the face with rotation of the polyhedral virtual object.

14. The apparatus as claimed in claim 10, wherein causing display of the content captured from the camera perspective associated with the selected first face of the polyhedral virtual object causes display of the content as a panorama.

15. The apparatus as claimed in claim 14, wherein the panorama is displayed behind the polyhedral virtual object.

16. The apparatus as claimed in claim 10, wherein orienting the first face in the predetermined direction within the virtual visual space comprises orienting the first face so that it is the closest of the at least N faces to a user.

17. The apparatus as claimed in claim 10, wherein each of the N faces of the polyhedral virtual object is defined with a normal vector and wherein each camera perspective is aligned with a normal vector, or wherein each of the N faces has a normal vector aligned with a different camera perspective.

18. The apparatus of claim 10, wherein the first number (N) comprises a number of all the different camera perspectives configured to provide content for display.

* * * * *